(12) United States Patent
Xu et al.

(10) Patent No.: US 9,870,741 B2
(45) Date of Patent: Jan. 16, 2018

(54) DISPLAY SUBSTRATE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Yubo Xu, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 29 days.

(21) Appl. No.: 14/428,807

(22) PCT Filed: Jul. 25, 2014

(86) PCT No.: PCT/CN2014/083007
§ 371 (c)(1),
(2) Date: Mar. 17, 2015

(87) PCT Pub. No.: WO2015/113385
PCT Pub. Date: Aug. 6, 2015

(65) Prior Publication Data
US 2016/0012784 A1    Jan. 14, 2016

(30) Foreign Application Priority Data
Jan. 29, 2014  (CN) .......................... 2014 1 0043971

(51) Int. Cl.
G09G 3/36    (2006.01)
G02F 1/1335  (2006.01)

(52) U.S. Cl.
CPC ...... *G09G 3/3607* (2013.01); *G02F 1/133514* (2013.01); *G02F 2201/52* (2013.01); *G09G 2300/0452* (2013.01)

(58) Field of Classification Search
None
See application file for complete search history.

(56) References Cited

U.S. PATENT DOCUMENTS

2005/0134763 A1    6/2005  Kang
2007/0121039 A1    5/2007  Tago et al.

FOREIGN PATENT DOCUMENTS

CN    101349845 A    1/2009
CN    101387778 A    3/2009
(Continued)

OTHER PUBLICATIONS

International Search Report for International Application No. PCT/CN2014/083007.
(Continued)

*Primary Examiner* — Kenneth B Lee, Jr.
(74) *Attorney, Agent, or Firm* — Nath, Goldberg & Meyer; Joshua B. Goldberg

(57) ABSTRACT

The present invention provides a display substrate and a display device. The display substrate comprises a substrate base and a plurality of pixel groups repeatedly arranged on the substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, at least one of the first subpixel, the second subpixel and the third subpixel are provided with a white light transmission region therein, and the fourth subpixel is a white subpixel.

20 Claims, 4 Drawing Sheets

(56) References Cited

FOREIGN PATENT DOCUMENTS

| | | |
|---|---|---|
| CN | 202049251 U | 11/2011 |
| CN | 103792724 A | 5/2014 |
| CN | 103792725 A | 5/2014 |
| JP | 2013190537 A | 9/2013 |
| KR | 10-1067555 B1 | 9/2011 |

OTHER PUBLICATIONS

International Patent Application No. PCT/CN2014/083007, English translation of Written Opinion of the International Searching Authority dated Oct. 29, 2014, three (3) pages. previously submitted in Chinese on Mar. 17, 2015.

Chinese Patent Application No. 201410043971.4, Office Action dated Nov. 2, 2015, eight (8) pages, English Translation, eight (8) pages.

2nd office action issued in corresponding Chinese Application No. 201410043971.4 dated Apr. 15, 2016.

DISPLAY SUBSTRATE AND DISPLAY DEVICE

CROSS-REFERENCE

This is a National Phase Application filed under 35 U.S.C. 371 as a national stage of PCT/CN2014/083007, filed Jul. 25, 2014, an application claiming the benefit of Chinese Application No. 201410043971.4, filed Jan. 29, 2014, the content of each of which is hereby incorporated by reference in its entirety.

FIELD OF THE INVENTION

The present invention relates to the technical field of display, and particularly relates to a display substrate and a display device.

BACKGROUND OF THE INVENTION

Currently, liquid crystal display is the most commonly used panel display, wherein thin film transistor liquid crystal display (TFT-LCD) is the mainstream product of the liquid crystal display. Display device is an important member of the liquid crystal display. The display device is formed by aligning an array substrate and a color filter substrate to form a cell and filling a layer of liquid crystal between the array substrate and the color filter substrate.

FIG. 1 shows a structural diagram of a color filter substrate in the prior art. As shown in FIG. 1, the color filter substrate comprises: a black matrix 10, and a red subpixel 11, a green subpixel 12, a blue subpixel 13 and a white subpixel 14 arranged successively. In the first row of subpixels, the red subpixel 11, the green subpixel 12, the blue subpixel 13 and the white subpixel 14 are arranged successively. In the second row of subpixels, the blue subpixel 13, the white subpixel 14, the red subpixel 11 and the green subpixel 12 are arranged successively. In the third row of subpixels, the white subpixel 14, the red subpixel 11, the green subpixel 12 and the blue subpixel 13 are arranged successively. In the fourth row of subpixels, the green subpixel 12, the blue subpixel 13, the white subpixel 14 and the red subpixel 11 are arranged successively.

However, in the prior art, since transmittances of three kinds of colors of red, green and blue are low, the transmittances of the red subpixel 11, the green subpixel 12 and the blue subpixel 13 are low. Generally, the transmittances of the red subpixel 11, the green subpixel 12 and the blue subpixel 13 are less than 30%, thus the overall transmittance of the display device is low.

SUMMARY OF THE INVENTION

An object of the present invention is to provide a display substrate and a display device for improving transmittance of the display device.

In order to achieve the object described above, the present invention provides a display substrate, comprising a substrate base and a plurality of pixel groups repeatedly arranged on the substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, at least one of the first subpixel, the second subpixel and the third subpixel are provided with a white light transmission region therein, and the fourth subpixel is a white subpixel.

Optionally, in four rows of subpixels of one of the pixel groups, the first subpixel, the second subpixel, the third subpixel and the fourth subpixel in one row of subpixels are arranged successively, the second subpixel, the third subpixel, the fourth subpixel and the first subpixel in one row of subpixels are arranged successively, the fourth subpixel, the first subpixel, the second subpixel and the third subpixel in one row of subpixels are arranged successively, and the third subpixel, the fourth subpixel, the first subpixel and the second subpixel in one row of subpixels are arranged successively.

Optionally, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively.

Optionally, the first subpixel, the second subpixel, the third subpixel and the fourth subpixel in a first row of subpixels are arranged successively, the third subpixel, the fourth subpixel, the first subpixel and the second subpixel in a second row of subpixels are arranged successively, the fourth subpixel, the first subpixel, the second subpixel and the third subpixel in a third row of subpixels are arranged successively, and the second subpixel, the third subpixel, the fourth subpixel and the first subpixel in a fourth row of subpixels are arranged successively.

Optionally, the first subpixel is a red subpixel, the second pixel is a green subpixel, and the third subpixel is a blue subpixel.

Optionally, in each row of subpixels, four or two subpixels of the first subpixel, the second subpixel, the third subpixel and the fourth subpixel constitute one pixel unit.

Optionally, in each row of subpixels, if two subpixels of the first subpixel, the second subpixel, the third subpixel and the fourth subpixel constitute one pixel unit, at least one of the subpixels in the pixel unit not comprising the fourth subpixel are provided with the white light transmission region therein.

Optionally, the third subpixel in the pixel unit not comprising the fourth subpixel is provided the white light transmission region therein.

Optionally, the first subpixel or the third subpixel in the pixel unit not comprising the fourth subpixel is provided with the white light transmission region therein.

Optionally, the white light transmission region is a hollow region.

In order to achieve the object described above, the present invention provides a display device comprising the display substrate described above.

In technical solutions of the display substrate and the display device provided by the present invention, a plurality of pixel groups are repeatedly arranged on a substrate base, each of the pixel groups comprises four first subpixels, four second subpixels, four third subpixels and four fourth subpixels. In the pixel group, except for the fourth subpixel being the white subpixel, at least one of the first subpixel, the second subpixel and the third subpixel are provided with the white light transmission region therein, which effectively improves the transmittance of the display substrate, thus transmittance of the display device is improved.

DETAILED DESCRIPTION OF THE EMBODIMENTS

In order to make the persons skilled in the art understand the technical solutions of the present invention better, the display substrate and the display device provided by the present invention will be described in detail below in conjunction with the accompanying drawings.

Figure 1:
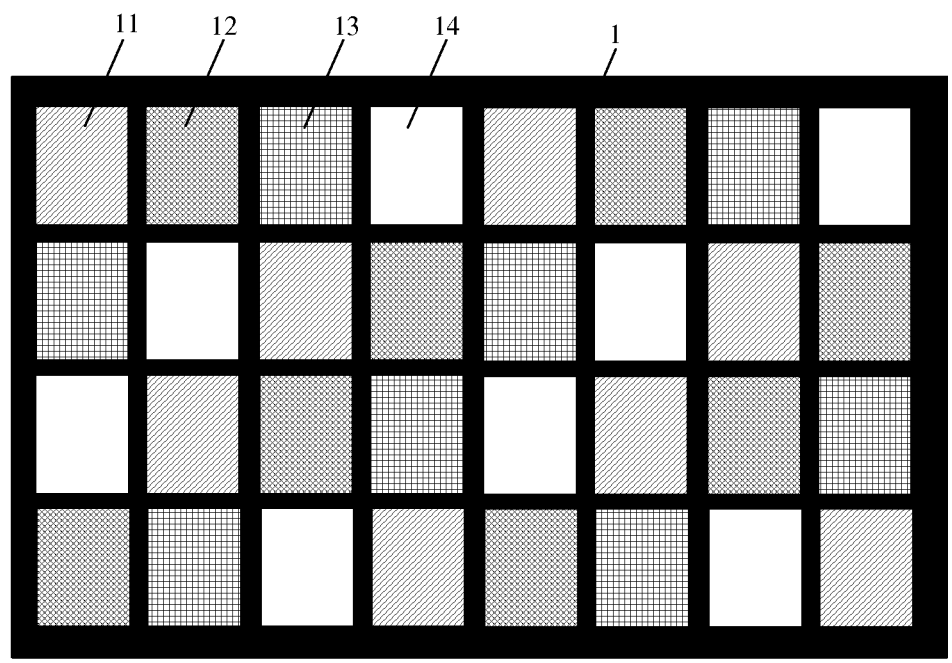
FIG. 1 is a structural diagram of a color filter substrate in the prior art.
Figure 2:
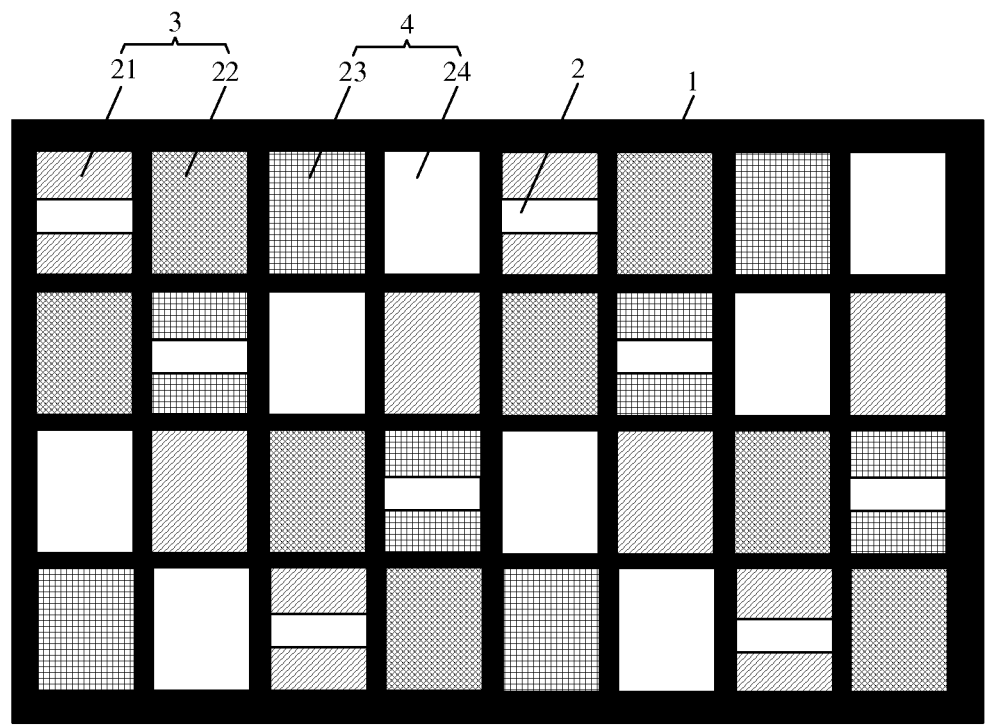
FIG. 2 is a structural diagram of a display substrate in accordance with a first embodiment of the present invention.

FIG. 2 is a structural diagram of a display substrate in accordance with a first embodiment of the present invention. As shown in FIG. 2, the display substrate comprises: a substrate base and a plurality of pixel groups repeatedly arranged on the substrate base, each of the pixel groups comprises four first subpixels 21, four second subpixels 22, four third subpixels 23 and four fourth subpixels 24, the subpixels in each of the pixel groups are arranged in a 4×4 matrix, each row of subpixels in each of the pixel groups include one first subpixel 21, one second subpixel 22, one third subpixel 23 and one fourth subpixel 24. In four rows of subpixels of one of the pixel groups, the first subpixel 21, the second subpixel 22, the third subpixel 23 and the fourth subpixel 24 in one row of subpixels are arranged successively, the second subpixel 22, the third subpixel 23, the fourth subpixel 24 and the first subpixel 21 in one row of subpixels are arranged successively, the fourth subpixel 24, the first subpixel 21, the second subpixel 22 and the third subpixel 23 in one row of subpixels are arranged successively, and the third subpixel 23, the fourth subpixel 24, the first subpixel 21 and the second subpixel 22 in one row of subpixels are arranged successively, at least one of the first subpixel 21, the second subpixel 22 and the third subpixel 23 are provided with a white light transmission region 2 therein, and the fourth subpixel 24 is a white subpixel.

In the present embodiment, the first subpixel 21, the second subpixel 22, the third subpixel 23 and the fourth subpixel 24 in a first row of subpixels are arranged successively, the second subpixel 22, the third subpixel 23, the fourth subpixel 24 and the first subpixel 21 in a second row of subpixels are arranged successively, the fourth subpixel 24, the first subpixel 21, the second subpixel 22 and the third subpixel 23 in a third row of subpixels are arranged successively, and the third subpixel 23, the fourth subpixel 24, the first subpixel 21 and the second subpixel 22 in a fourth row of subpixels are arranged successively.

Specifically, the first subpixel 21 is a red subpixel, the second subpixel 22 is a green subpixel, the third subpixel 23 is a blue subpixel, and the fourth subpixel 24 is a white subpixel. In one of the pixel groups, the red subpixel, the green subpixel, the blue subpixel and the white subpixel in the first row of subpixels are arranged successively, the green subpixel, the blue subpixel, the white subpixel and the red subpixel in the second row of subpixels are arranged successively, the white subpixel, the red subpixel, the green subpixel and the blue subpixel in the third row of subpixels are arranged successively, and the blue subpixel, the white subpixel, the red subpixel and the green subpixel in the fourth row of subpixels are arranged successively.

In the present embodiment, the transmittances of the red subpixel, the green subpixel and the blue subpixel are less than 30%, and the transmittance of white light transmission region 2 approximates to 100%, thus at least one of the red subpixel, the green subpixel and the blue subpixel are provided with the white light transmission region 2 therein, so that the transmittance of the display substrate may be effectively improved.

In each row of subpixels, four or two subpixels of the first subpixel 21, the second subpixel 22, the third subpixel 23 and the fourth subpixel 24 constitute one pixel unit. In the present embodiment, two subpixels of the first subpixel 21, the second subpixel 22, the third subpixel 23 and the fourth subpixel 24 constitute one pixel unit. If the first subpixel 21 is a red subpixel, the second subpixel 22 is a green subpixel and the third subpixel 23 is a blue subpixel, the pixel unit 3 in the first row of subpixels comprises the red subpixel and the green subpixel arranged successively, the pixel unit 4 in the first row of subpixels comprises the blue subpixel and the white subpixel arranged successively, the pixel unit 3 in the second row of subpixels comprises the green subpixel and the blue subpixel arranged successively, the pixel unit 4 in the second row of subpixels comprises the white subpixel and the red subpixel arranged successively, the pixel unit 3 in the third row of subpixels comprises the white subpixel and the red subpixel arranged successively, the pixel unit 4 in the third row of subpixels comprises the green subpixel and the blue subpixel arranged successively, the pixel unit 3 in the fourth row of subpixels comprises the blue subpixel and the white subpixel arranged successively, and the pixel unit 4 in the fourth row of subpixels comprises the red subpixel and the green subpixel arranged successively.

In the present embodiment, if two subpixels of the first subpixel 21, the second subpixel 22, the third subpixel 23 and the fourth subpixel 24 constitute one pixel unit, at least one of the subpixels in the pixel unit not comprising the fourth subpixel are provided with the white light transmission region 2 therein. For example, the first subpixel 21 and/or the third subpixel 23 in the pixel unit not comprising the fourth subpixel 24 are provided the white light transmission region 2 therein. If the first subpixel 21 is a red subpixel, the second subpixel 22 is a green subpixel, and the third subpixel 23 is a blue subpixel, for example, as shown in FIG. 2, the first pixel unit 3 of the first row of subpixels comprises the red subpixel and the green subpixel and does not comprise the white subpixel, thus the red subpixel in the first pixel unit 3 of the first row of subpixels is provided with the white light transmission region 2 therein; the second pixel unit 4 of the first row of subpixels comprises the blue subpixel and the white subpixel, thus the blue subpixel in the second pixel unit 4 does not need to be provided with the white light transmission region 2 therein; the first pixel unit 3 of the second row of subpixels comprises the green subpixel and the blue subpixel and does not comprise the white subpixel, thus the blue pixel in the first pixel unit 3 of the second row of subpixels is provided with the white light transmission region 2 therein; the second pixel unit 4 of the second row of subpixels comprises the white subpixel and the red subpixel, thus the red subpixel in the second pixel unit 4 of the second row of subpixels does not need to be provided with the white light transmission region 2 therein; the first pixel unit 3 of the third row of subpixels comprises the white subpixel and the red subpixel, thus the red subpixel in the first pixel unit 3 of the third row of subpixels does not need to be provided with the white light transmission region 2 therein; the second pixel unit 4 of the third row of subpixels comprises the green subpixel and the blue subpixel and does not comprise the white subpixel, thus the blue subpixel 23 in the second pixel unit 4 of the third row of subpixels is provided with the white light transmission region 2 therein; the first pixel unit 3 of the fourth row of subpixels comprises the blue subpixel and the white subpixel, thus the blue subpixel in the first pixel unit 3 of the fourth row of subpixels does not need to be provided the white light transmission region 2 therein; the second pixel unit 4 of the fourth row of subpixels comprises the red subpixel and the green subpixel and does not comprise the white subpixel, thus the red subpixel in the second pixel unit 4 of the fourth row of subpixels is provided with the white light transmission region 2 therein. In the above technical solutions, each pixel unit comprises the white subpixel, or the white light transmission region, and each pixel unit comprises the red, green and blue color elements, thus display effect of the display picture is improved. In the above technical solutions, the white light transmission regions are provided so that the white color is more uniform, thus the transmittance of the display substrate is improved, meanwhile, the display effect of the display picture is improved, and visual experience of the user is optimized. Compared to the green subpixel, the user is less sensitive to the red subpixel and the blue subpixel, thus, by providing the white light transmission region in the red subpixel and the blue subpixel, the transmittance of the display substrate may be improved, and the display quality of the display picture is ensured.

In the present embodiment, the white light transmission region 2 is a hollow region. In the present embodiment, the white light transmission region 2 is in a strip shape. Optionally, in practical applications, the white light transmission region 2 may be in other shapes. In the present embodiment, the white light transmission region 2 is provided transversely. Optionally, in practical applications, the white light transmission region 2 also may be provided in other modes, for example, the white light transmission region 2 may be provided obliquely.

In the present embodiment, in the direction perpendicular to the arrangement direction of the first subpixel 21, the second subpixel 22 and the third subpixel 23, for example, in the direction of column, the dimension of the white light transmission region 2 is less than or equal to ⅓ of the dimension of the first subpixel 21, the second subpixel 22 or the third subpixel 23, and is greater than 0.

Optionally, the display substrate may further comprise: a black matrix 1 formed on the substrate base for separating the subpixels.

Alternatively, all of the first subpixels 21, the second subpixels 22 and the third subpixels 23 are provided with the white light transmission regions 2 therein, which will not be specifically illustrated. Alternatively, all or a part of the second subpixels 22 are provided with the white light transmission regions 2 therein, which will not be specifically illustrated. Alternatively, all or a part of any two kinds of the first subpixels 21, the second subpixels 22 and the third subpixels 23 are provided with the white light transmission regions 2 therein, which will not be specifically illustrated.

In practical applications, the number and the position of the white light transmission region may be determined in accordance with color ratio requirement so that the transmittance of the display substrate is improved and the display quality of the display picture is ensured, which will not be enumerated one by one here.

In a practical display procedure, the red brightness signal corresponding to the original red subpixel, the green brightness signal corresponding to the original green subpixel and the blue brightness signal corresponding to the original blue subpixel are processed, for example, the voltage signal provided to the subpixel is appropriately increased or decreased in accordance with the ratio of the white light transmission region to the area of the subpixel so that the gray scale of the subpixel is increased or decreased, thus the color gamut of the red subpixel, the green subpixel and the blue subpixel provided with the white light transmission region may be wider.

In the technical solutions of the display substrate in the present embodiment, the plurality of pixel groups are repeatedly arranged on the substrate base, each of the pixel groups comprises four first subpixels, four second subpixels, four third subpixels and four fourth subpixels. In the pixel group, except for the fourth subpixel being the white subpixel, at least one of the first subpixel, the second subpixel and the third subpixel are provided with the white light transmission region therein, which effectively improves the transmittance of the display substrate, thus transmittance of the display device is improved. Since the transmittance of the display device may be improved by the present invention, in the premise that the overall brightness of the display device of the present embodiment is consistent with the overall brightness of the display device of the prior art, the luminous brightness of the backlight source may be reduced. In the present embodiment, only a part of the subpixels are provided with the white light transmission regions, the white light transmission regions in the direction of row are prevented from forming a continuous white region, thus occurrence of white lines is avoided in the display picture.

Figure 3:
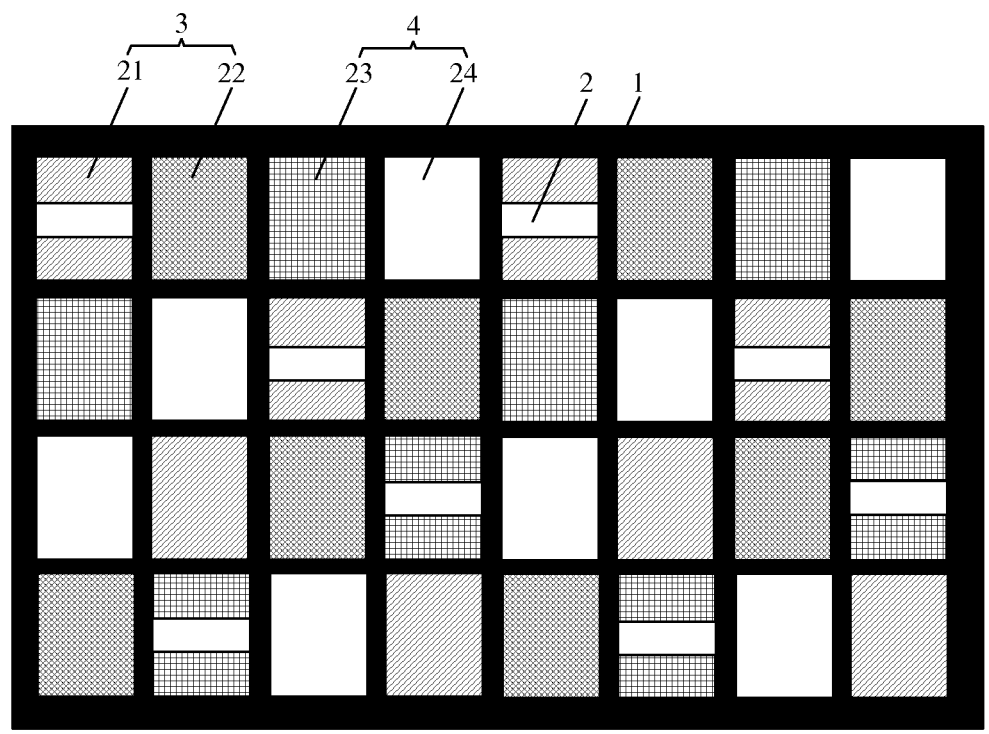
FIG. 3 is a structural diagram of a display substrate in accordance with a second embodiment of the present invention.

FIG. 3 is a structural diagram of a display substrate in accordance with a second embodiment of the present invention. As shown in FIG. 3, the display substrate comprises: a substrate base and a plurality of pixel groups repeatedly arranged on the substrate base, each of the pixel groups comprises four first subpixels 21, four second subpixels 22, four third subpixels 23 and four fourth subpixels 24, the subpixels in each of the pixel groups are arranged in a 4×4 matrix, each row of subpixels in each of the pixel groups include one first subpixel 21, one second subpixel 22, one third subpixel 23 and one fourth subpixel 24. In four rows of subpixels of one of the pixel groups, the first subpixel 21, the second subpixel 22, the third subpixel 23 and the fourth subpixel 24 in one row of subpixels are arranged successively, the second subpixel 22, the third subpixel 23, the fourth subpixel 24 and the first subpixel 21 in one row of subpixels are arranged successively, the fourth subpixel 24, the first subpixel 21, the second subpixel 22 and the third subpixel 23 in one row of subpixels are arranged successively, and the third subpixel 23, the fourth subpixel 24, the first subpixel 21 and the second subpixel 22 in one row of subpixels are arranged successively, at least one of the first subpixel 21, the second subpixel 22 and the third subpixel 23 are provided with the white light transmission region 2 therein, and the fourth subpixel 24 is a white subpixel.

In the present embodiment, the first subpixel 21, the second subpixel 22, the third subpixel 23 and the fourth subpixel 24 in a first row of subpixels are arranged successively, the third subpixel 23, the fourth subpixel 24, the first subpixel 21 and the second subpixel 22 in a second row of subpixels are arranged successively, the fourth subpixel 24, the first subpixel 21, the second subpixel 22 and the third subpixel 23 in a third row of subpixels are arranged successively, and the second subpixel 22, the third subpixel 23, the fourth subpixel 24 and the first subpixel 21 in a fourth row of subpixels are arranged successively.

Specifically, the first subpixel 21 is a red subpixel, the second subpixel 22 is a green subpixel, and the third subpixel 23 is a blue subpixel. In one of the pixel groups, the red subpixel, the green subpixel, the blue subpixel and the white subpixel in the first row of subpixels are arranged successively, the blue subpixel, the white subpixel, the red subpixel and the green subpixel in the second row of subpixels are arranged successively, the white subpixel, the red subpixel, the green subpixel and the blue subpixel in the third row of subpixels are arranged successively, and the green subpixel, the blue subpixel, the white subpixel and the red subpixel in the fourth row of subpixels are arranged successively.

In the present embodiment, the transmittances of the red subpixel, the green subpixel and the blue subpixel are less than 30%, and the transmittance of white light transmission region 2 approximates to 100%, thus at least one of the red subpixel, the green subpixel and the blue subpixel are provided with the white light transmission region 2 therein, so that the transmittance of the display substrate may be effectively improved.

In each row of subpixels, four or two subpixels of the first subpixel 21, the second subpixel 22, the third subpixel 23 and the fourth subpixel 24 constitute one pixel unit. In the present embodiment, two subpixels of the first subpixel 21, the second subpixel 22, the third subpixel 23 and the fourth subpixel 24 constitute one pixel unit. If the first subpixel 21 is a red subpixel, the second subpixel 22 is a green subpixel and the third subpixel 23 is a blue subpixel, the pixel unit 3 in the first row of subpixels comprises the red subpixel and the green subpixel arranged successively, the pixel unit 4 in the first row of subpixels comprises the blue subpixel and the white subpixel arranged successively, the pixel unit 3 in the second row of subpixels comprises the blue subpixel and the white subpixel arranged successively, the pixel unit 4 in the second row of subpixels comprises the red subpixel and green subpixel arranged successively, the pixel unit 3 in the third row of subpixels comprises the white subpixel and the red subpixel arranged successively, the pixel unit 4 in the third row of subpixels comprises the green subpixel and the blue subpixel arranged successively, the pixel unit 3 in the fourth row of subpixels comprises the green subpixel and the blue subpixel arranged successively, and the pixel unit 4 in the fourth row of subpixels comprises the white subpixel and the red subpixel arranged successively.

In the present embodiment, if two subpixels of the first subpixel 21, the second subpixel 22, the third subpixel 23 and the fourth subpixel 24 constitute one pixel unit, at least one of the subpixels in the pixel unit not comprising the fourth subpixel 24 are provided with the white light transmission region 2 therein. For example, the first subpixel 21 and/or the third subpixel 23 in the pixel unit not comprising the fourth subpixel 24 are provided the white light transmission region 2 therein. If the first subpixel 21 is a red subpixel, the second subpixel 22 is a green subpixel, and the third subpixel 23 is a blue subpixel, for example, as shown in FIG. 3, the first pixel unit 3 of the first row of subpixels comprises the red subpixel and the green subpixel and does not comprise the white subpixel, thus the red subpixel in the first pixel unit 3 of the first row of subpixels is provided with the white light transmission region 2 therein; the second pixel unit 4 of the first row of subpixels comprises the blue subpixel and the white subpixel, thus the blue subpixel in the second pixel unit 4 does not need to be provided with the white light transmission region 2 therein; the first pixel unit 3 of the second row of subpixels comprises the blue subpixel and the white subpixel, thus the blue pixel in the first pixel unit 3 of the second row of subpixels does not need to be provided with the white light transmission region 2 therein; the second pixel unit 4 of the second row of subpixels comprises the red subpixel and the green subpixel and does not comprises the white subpixel, thus the red subpixel in the second pixel unit 4 of the second row of subpixels is provided with the white light transmission region 2 therein; the first pixel unit 3 of the third row of subpixels comprises the white subpixel and the red subpixel, thus the red subpixel in the first pixel unit 3 of the third row of subpixels does not need to be provided with the white light transmission region 2 therein; the second pixel unit 4 of the third row of subpixels comprises the green subpixel and the blue subpixel and does not comprise the white subpixel, thus the blue subpixel 23 in the second pixel unit 4 of the third row of subpixels is provided with the white light transmission region 2 therein; the first pixel unit 3 of the fourth row of subpixels comprises the green subpixel and the blue subpixel and does not comprises the white subpixel, thus the blue subpixel in the first pixel unit 3 of the fourth row of subpixels is provided the white light transmission region 2 therein; the second pixel unit 4 of the fourth row of subpixels comprises the white subpixel and the red subpixel, thus the red subpixel in the second pixel unit 4 of the fourth row of subpixels does not need to be provided with the white light transmission region 2 therein. In the above technical solutions, each pixel unit comprises the white subpixel, or the white light transmission region, and each pixel unit comprises the red, green and blue color elements, thus display effect of the display picture is improved. In the above technical solutions, the white light transmission regions are provided so that the white color is more uniform, thus the transmittance of the display substrate is improved, meanwhile, the display effect of the display picture is improved, and visual experience of the user is optimized. Compared to the green subpixel, the user is less sensitive to the red subpixel and the blue subpixel, thus, by providing the white light transmission region in the red subpixel and the blue subpixel, the transmittance of the display substrate may be improved, and the display quality of the display picture is ensured.

In the present embodiment, the white light transmission region 2 is a hollow region. In the present embodiment, the white light transmission region 2 is in a strip shape. Optionally, in practical applications, the white light transmission region 2 may be in other shapes. In the present embodiment, the white light transmission region 2 is provided transversely. Optionally, in practical applications, the white light transmission region 2 also may be provided in other modes, for example, the white light transmission region 2 may be provided obliquely.

In the present embodiment, preferably, in the direction perpendicular to the arrangement direction of the first subpixel 21, the second subpixel 22 and the third subpixel 23, for example, in the direction of column, the dimension of the white light transmission region 2 is less than or equal to ⅓ of the dimension of the first subpixel 21, the second subpixel 22 or the third subpixel 23, and is greater than 0.

Optionally, the display substrate may further comprise: a black matrix 1 formed on the substrate base for separating the subpixels.

Alternatively, all of the first subpixels 21, the second subpixels 22 and the third subpixels 23 are provided with the white light transmission regions 2 therein, which will not be specifically illustrated. Alternatively, all or a part of the second subpixels 22 are provided with the white light transmission regions 2 therein, which will not be specifically illustrated. Alternatively, all or a part of any two kinds of the first subpixels 21, the second subpixels 22 and the third subpixels 23 are provided with the white light transmission regions 2 therein, which will not be specifically illustrated. In practical applications, the number and the position of the white light transmission region may be determined in accordance with color ratio requirement so that the transmittance of the display substrate is improved and the display quality of the display picture is ensured, which will not be enumerated one by one here.

In a practical display procedure, the red brightness signal corresponding to the original red subpixel, the green brightness signal corresponding to the original green subpixel and the blue brightness signal corresponding to the original blue subpixel are processed, for example, the voltage signal provided to the subpixel is appropriately increased or decreased in accordance with the ratio of the white light transmission region to the area of the subpixel so that the gray scale of the subpixel is increased or decreased, thus the color gamut of the red subpixel, the green subpixel and the blue subpixel provided with the white light transmission region may be wider.

In the technical solutions of the display substrate in the present embodiment, the plurality of pixel groups are repeatedly arranged on the substrate base, each of the pixel groups comprises four first subpixels, four second subpixels, four third subpixels and four fourth subpixels. In the pixel group, except for the fourth subpixel being the white subpixel, at least one of the first subpixel, the second subpixel and the third subpixel are provided with the white light transmission region therein, which effectively improves the transmittance of the display substrate, thus transmittance of the display device is improved. Since the transmittance of the display device may be improved by the present invention, in the premise that the overall brightness of the display device of the present embodiment is consistent with the overall brightness of the display device of the prior art, the luminous brightness of the backlight source may be reduced. In the present embodiment, only a part of the subpixels are provided with the white light transmission regions, the white light transmission regions in the direction of row are prevented from forming a continuous white region, thus occurrence of white lines is avoided in the display picture.

Figure 4:
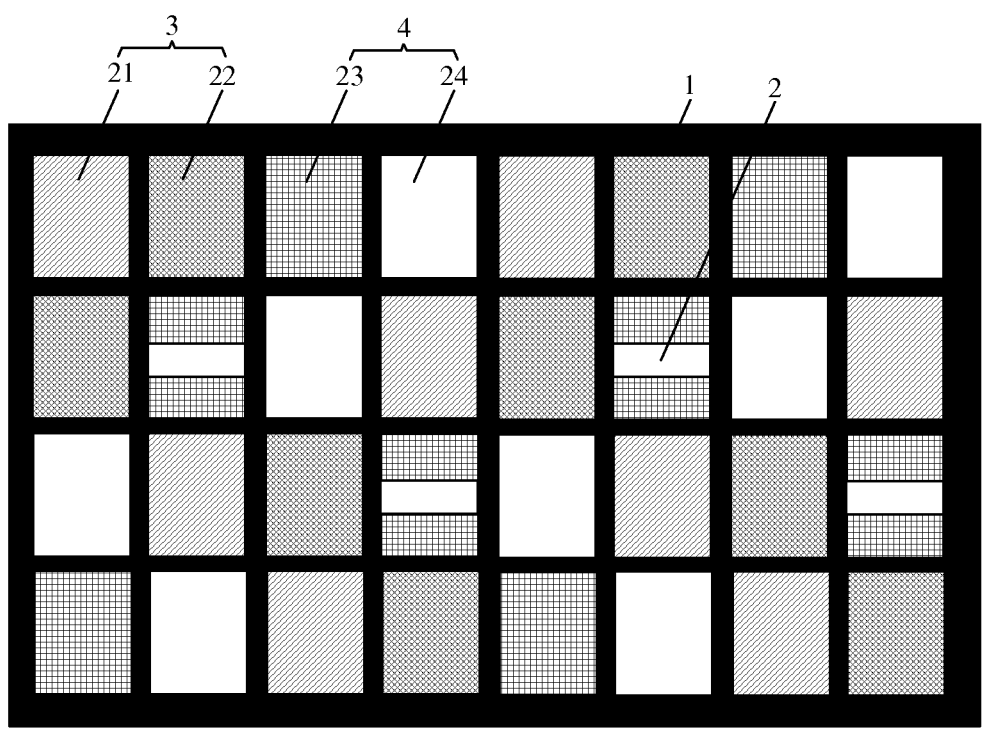
FIG. 4 is a structural diagram of a display substrate in accordance with a third embodiment of the present invention.

FIG. 4 is a structural diagram of a display substrate in accordance with a third embodiment of the present invention. As shown in FIG. 4, the present embodiment is different from the first embodiment in that: in the present embodiment, the third subpixel 23 in the pixel unit not comprising the fourth subpixel 24 is provided with the white light transmission region 2 therein.

If the first subpixel 21 is a red subpixel, the second subpixel 22 is a green subpixel and the third subpixel 23 is a blue subpixel, for example, as shown in FIG. 4, the first pixel unit 3 of the first row of subpixels comprises the red subpixel and the green subpixel and does not comprise the white subpixel, but the first pixel unit 3 of the first row of subpixels does not comprises the blue subpixel, thus the first pixel unit 3 of the first row of subpixels does not need to be provided with the white light transmission region 2 therein; the second pixel unit 4 of the first row of subpixels comprises the blue subpixel and the white subpixel, thus the blue subpixel in the second pixel unit 4 does not need to be provided with the white light transmission region 2 therein; the first pixel unit 3 of the second row of subpixels comprises the green subpixel and the blue subpixel and does not comprise the white subpixel, thus the blue pixel in the first pixel unit 3 of the second row of subpixels is provided with the white light transmission region 2 therein; the second pixel unit 4 of the second row of subpixels comprises the white subpixel and the red subpixel, thus the red subpixel in the second pixel unit 4 of the second row of subpixels does not need to be provided with the white light transmission region 2 therein; the first pixel unit 3 of the third row of subpixels comprises the white subpixel and the red subpixel, thus the red subpixel in the first pixel unit 3 of the third row of subpixels does not need to be provided with the white light transmission region 2 therein; the second pixel unit 4 of the third row of subpixels comprises the green subpixel and the blue subpixel and does not comprise the white subpixel, thus the blue subpixel 23 in the second pixel unit 4 of the third row of subpixels is provided with the white light transmission region 2 therein; the first pixel unit 3 of the fourth row of subpixels comprises the blue subpixel and the white subpixel, thus the blue subpixel in the first pixel unit 3 of the fourth row of subpixels does not need to be provided the white light transmission region 2 therein; the second pixel unit 4 of the fourth row of subpixels comprises the red subpixel and the green subpixel and does not comprise the white subpixel, but the second pixel unit 4 of the fourth row of subpixels does not comprises the blue subpixel, thus the second pixel unit 4 of the fourth row of subpixels does not need to be provided with the white light transmission region 2 therein. In the above technical solutions, the white light transmission regions are provided so that the white color is more uniform, thus the transmittance of the display substrate is improved, meanwhile, the display effect of the display picture is improved, and visual experience of the user is optimized. Compared to the green subpixel, the user is less sensitive to the red subpixel and the blue subpixel, thus, by providing the white light transmission region in the blue subpixel, the transmittance of the display substrate may be improved, and the display quality of the display picture is ensured.

Figure 5:
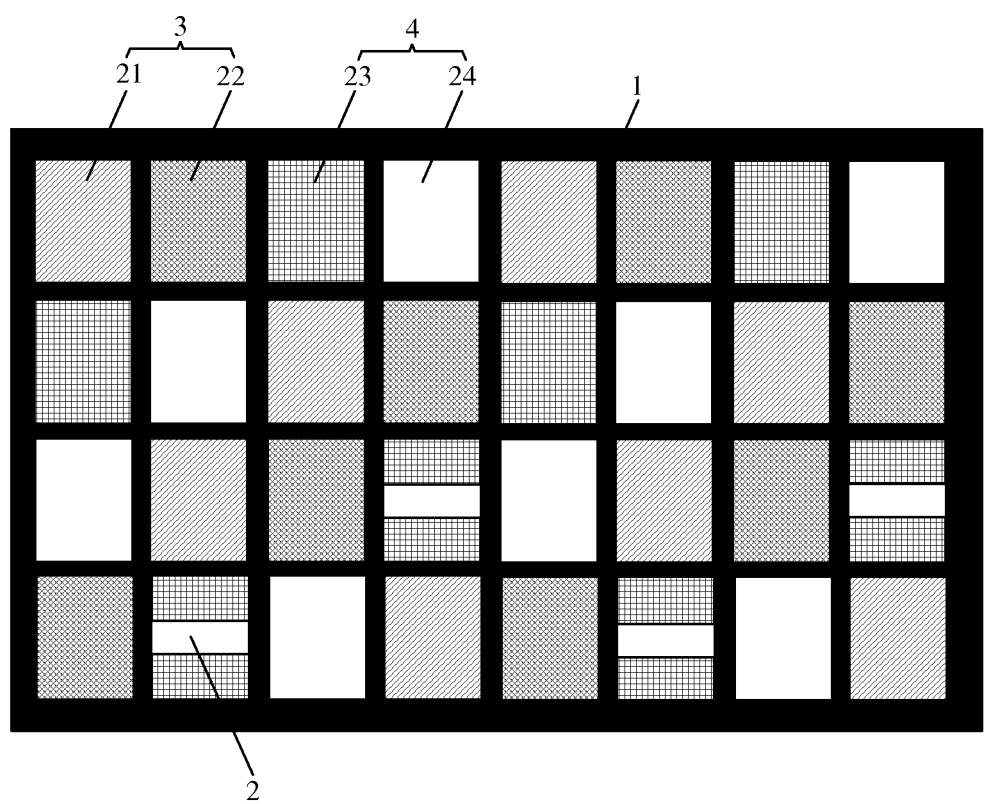
FIG. 5 is a structural diagram of a display substrate in accordance with a fourth embodiment of the present invention.

FIG. 5 is a structural diagram of a display substrate in accordance with a fourth embodiment of the present embodiment. As shown in FIG. 4, the present embodiment is different from the second embodiment in that: in the present embodiment, the third subpixel 23 in the pixel unit not comprising the fourth subpixel 24 is provided with the white light transmission region 2 therein.

If the first subpixel 21 is a red subpixel, the second subpixel 22 is a green subpixel, and the third subpixel 23 is a blue subpixel, for example, as shown in FIG. 5, the first pixel unit 3 of the first row of subpixels comprises the red subpixel and the green subpixel and does not comprise the white subpixel, but the first pixel unit 3 of the first row of subpixels does not comprises the blue subpixel, thus the first pixel unit 3 of the first row of subpixels does not need to be provided with the white light transmission region 2 therein; the second pixel unit 4 of the first row of subpixels comprises the blue subpixel and the white subpixel, thus the blue subpixel in the second pixel unit 4 does not need to be provided with the white light transmission region 2 therein; the first pixel unit 3 of the second row of subpixels comprises the blue subpixel and the white subpixel, thus the blue pixel in the first pixel unit 3 of the second row of subpixels does not need to be provided with the white light transmission region 2 therein; the second pixel unit 4 of the second row of subpixels comprises the red subpixel and the green subpixel and does not comprises the white subpixel, but the second pixel unit 4 of the second row of subpixels does not comprises the blue subpixel, thus the second pixel unit 4 of the second row of subpixels does not need to be provided with the white light transmission region 2 therein; the first pixel unit 3 of the third row of subpixels comprises the white subpixel and the red subpixel, thus the red subpixel in the first pixel unit 3 of the third row of subpixels does not need to be provided with the white light transmission region 2 therein; the second pixel unit 4 of the third row of subpixels comprises the green subpixel and the blue subpixel and does not comprise the white subpixel, thus the blue subpixel 23 in the second pixel unit 4 of the third row of subpixels is provided with the white light transmission region 2 therein; the first pixel unit 3 of the fourth row of subpixels comprises the green subpixel and the blue subpixel and does not comprises the white subpixel, thus the blue subpixel in the first pixel unit 3 of the fourth row of subpixels is provided the white light transmission region 2 therein; the second pixel unit 4 of the fourth row of subpixels comprises the white subpixel and the red subpixel, thus the red subpixel in the second pixel unit 4 of the fourth row of subpixels does not need to be provided with the white light transmission region 2 therein. In the above technical solutions, the white light transmission regions are provided so that the white color is more uniform, thus the transmittance of the display substrate is improved, meanwhile, the display effect of the display picture is improved, and visual experience of the user is optimized. Compared to the green subpixel, the user is less sensitive to the red subpixel and the blue subpixel, thus, by providing the white light transmission region in the blue subpixel, the transmittance of the display substrate may be improved, and the display quality of the display picture is ensured.

A fifth embodiment of the present invention provides a display device comprising a display substrate and an opposite substrate for aligning with the display substrate to form a cell, and a layer of liquid crystal is provided between the display substrate and the opposite substrate, wherein the display substrate is any one of the display substrates described in the first embodiment through the fourth embodiment.

For example, the display substrate is a color filter substrate, and the opposite substrate for aligning with the display substrate to form a cell is an array substrate.

In addition, the display substrate may be a color filter on array (COA) substrate, and the opposite substrate for aligning with the display substrate to form a cell is a glass substrate.

Optionally, on the COA substrate, a black matrix, a red subpixel unit, a green subpixel unit, a blue subpixel unit and a white subpixel unit are formed on the front side of the substrate base, and the structures of the original array substrate are formed on the back side of the substrate base. That is, the COA substrate is formed by providing the original color filter substrate and the original array substrate on the front side and the back side of a substrate base respectively.

In the technical solutions of the display substrate in the present embodiment, the plurality of pixel groups are repeatedly arranged on the substrate base, each of the pixel groups comprises four first subpixels, four second subpixels, four third subpixels and four fourth subpixels. In the pixel group, except for the fourth subpixel being the white subpixel, at least one of the first subpixel, the second subpixel and the third subpixel are provided with the white light transmission region therein, which effectively improves the transmittance of the display substrate, thus transmittance of the display device is improved. Since the transmittance of the display device may be improved by the present invention, in the premise that the overall brightness of the display device of the present embodiment is consistent with the overall brightness of the display device of the prior art, the luminous brightness of the backlight source may be reduced.

It could be understood that, the above implementations are merely exemplary embodiments adopted for describing the principle of the present invention, rather than limiting the present invention. Various variations and improvements may be made for those of ordinary skill in the art without departing from the spirit and essence of the present invention, and these variations and improvements are regarded within the protection scope of the present invention.

The invention claimed is:

1. A display substrate, comprising a substrate base and a plurality of pixel groups repeatedly arranged on the substrate base, wherein each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, at least one of the first subpixel, the second subpixel and the third subpixel are provided with a white light transmission region therein, and the fourth subpixel is a white subpixel.

2. The display substrate of claim 1, wherein, in four rows of subpixels of one of the pixel groups, the first subpixel, the second subpixel, the third subpixel and the fourth subpixel in one row of subpixels are arranged successively, the second subpixel, the third subpixel, the fourth subpixel and the first subpixel in one row of subpixels are arranged successively, the fourth subpixel, the first subpixel, the second subpixel and the third subpixel in one row of subpixels are arranged successively, and the third subpixel, the fourth subpixel, the first subpixel and the second subpixel in one row of subpixels are arranged successively.

3. The display substrate of claim 2, wherein the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively.

4. The display substrate of claim 2, wherein the first subpixel, the second subpixel, the third subpixel and the fourth subpixel in a first row of subpixels are arranged successively, the third subpixel, the fourth subpixel, the first subpixel and the second subpixel in a second row of subpixels are arranged successively, the fourth subpixel, the first subpixel, the second subpixel and the third subpixel in a third row of subpixels are arranged successively, and the second subpixel, the third subpixel, the fourth subpixel and the first subpixel in a fourth row of subpixels are arranged successively.

5. The display substrate of claim 1, wherein the first subpixel is a red subpixel, the second pixel is a green subpixel, and the third subpixel is a blue subpixel.

6. The display substrate of claim 2, wherein the first subpixel is a red subpixel, the second pixel is a green subpixel, and the third subpixel is a blue subpixel.

7. The display substrate of claim 3, wherein the first subpixel is a red subpixel, the second pixel is a green subpixel, and the third subpixel is a blue subpixel.

8. The display substrate of claim 4, wherein the first subpixel is a red subpixel, the second pixel is a green subpixel, and the third subpixel is a blue subpixel.

9. The display substrate of claim 5, wherein four or two subpixels of the first subpixel, the second subpixel, the third subpixel and the fourth subpixel constitute one pixel unit in each row of subpixels.

10. The display substrate of claim 6, wherein four or two subpixels of the first subpixel, the second subpixel, the third subpixel and the fourth subpixel constitute one pixel unit in each row of subpixels.

11. The display substrate of claim 7, wherein four or two subpixels of the first subpixel, the second subpixel, the third subpixel and the fourth subpixel constitute one pixel unit in each row of subpixels.

12. The display substrate of claim 8, wherein four or two subpixels of the first subpixel, the second subpixel, the third subpixel and the fourth subpixel constitute one pixel unit in each row of subpixels.

13. The display substrate of claim 5, wherein if two subpixels of the first subpixel, the second subpixel, the third subpixel and the fourth subpixel constitute one pixel unit in each row of subpixels, at least one of the subpixels in the pixel unit not comprising the fourth subpixel are provided with the white light transmission region therein.

14. The display substrate of claim 6, wherein if two subpixels of the first subpixel, the second subpixel, the third subpixel and the fourth subpixel constitute one pixel unit in each row of subpixels, at least one of the subpixels in the pixel unit not comprising the fourth subpixel are provided with the white light transmission region therein.

15. The display substrate of claim 7, wherein if two subpixels of the first subpixel, the second subpixel, the third subpixel and the fourth subpixel constitute one pixel unit in each row of subpixels, at least one of the subpixels in the pixel unit not comprising the fourth subpixel are provided with the white light transmission region therein.

16. The display substrate of claim 8, wherein if two subpixels of the first subpixel, the second subpixel, the third subpixel and the fourth subpixel constitute one pixel unit in each row of subpixels, at least one of the subpixels in the pixel unit not comprising the fourth subpixel are provided with the white light transmission region therein.

17. The display substrate of claim 13, wherein the third subpixel in the pixel unit not comprising the fourth subpixel is provided the white light transmission region therein.

18. The display substrate of claim 13, wherein the first subpixel or the third subpixel in the pixel unit not comprising the fourth subpixel is provided with the white light transmission region therein.

19. The display substrate of claim 1, wherein the white light transmission region is a hollow region.

20. The display device, comprising the display substrate of claim 1.

* * * * *